(12) United States Patent
Valsecchi et al.

(10) Patent No.: US 10,938,189 B2
(45) Date of Patent: Mar. 2, 2021

(54) LOW VOLTAGE ELECTRICAL SWITCHBOARD

(71) Applicant: ABB S.p.A., Milan (IT)

(72) Inventors: Davide Valsecchi, Seregno (IT); Simone Angelo Proserpio, Eupilio (IT)

(73) Assignee: ABB S.p.A., Milan (IT)

(*) Notice: Subject to any disclaimer, the term of this patent is extended or adjusted under 35 U.S.C. 154(b) by 0 days.

(21) Appl. No.: 16/127,997

(22) Filed: Sep. 11, 2018

(65) Prior Publication Data
US 2019/0081460 A1 Mar. 14, 2019

(30) Foreign Application Priority Data
Sep. 11, 2017 (EP) .................................... 17190427

(51) Int. Cl.
*H02B 1/21* (2006.01)
*H02B 11/173* (2006.01)
(Continued)

(52) U.S. Cl.
CPC .............. *H02B 1/21* (2013.01); *H02B 1/36* (2013.01); *H02B 11/173* (2013.01); *H02B 11/04* (2013.01)

(58) Field of Classification Search
CPC .......... H02B 1/21; H02B 1/36; H02B 11/173; H02B 11/04
(Continued)

(56) References Cited

U.S. PATENT DOCUMENTS

| | | | | |
|---|---|---|---|---|
| 539,296 A | * | 5/1895 | Piette ...................... | B07B 13/00 |
| | | | | 209/617 |
| 3,113,820 A | * | 12/1963 | Norden .................... | H02B 1/21 |
| | | | | 174/68.2 |

(Continued)

OTHER PUBLICATIONS

European Patent Office, Extended Search Report issued in corresponding Application No. 17190427.9, dated Feb. 19, 2018, 7 pp.

*Primary Examiner* — Zachary Pape
(74) *Attorney, Agent, or Firm* — Taft Stettinius & Hollister LLP

(57) ABSTRACT

A low voltage electrical switchboard comprising a supporting structure having vertical uprights and horizontal crossbars and further comprising a busbar compartment housing one or more busbars and an apparatus compartment housing one or more electrical apparatuses, said busbar compartment and said apparatus compartment being separated by a partitioning and insulating wall, characterized in that said partitioning and insulating wall has a first surface facing said busbar compartment which is provided with a plurality of retaining and supporting means for said busbars, and a second surface facing said apparatus compartment which is provided with a plurality of openings for insertion/extraction of first connection means between said busbars and said one or more electrical apparatuses through said partitioning and insulating wall, said first connection means being provided with first insulation means that cooperate with said partitioning and insulating wall to increase the distance in air between the phases during insertion/extraction of said connection means, said low voltage switchboard being further provided with mechanical locking means for locking said one or more electrical apparatuses and preventing their insertion/extraction into/from an operating position in contact with said busbars under predetermined conditions.

11 Claims, 12 Drawing Sheets

(51) Int. Cl.
*H02B 1/36* (2006.01)
*H02B 11/04* (2006.01)

(58) Field of Classification Search
USPC .................................................. 36/600–640
See application file for complete search history.

(56) References Cited

U.S. PATENT DOCUMENTS

| | | | | |
|---|---|---|---|---|
| 3,469,149 | A * | 9/1969 | Paape | H02B 1/21 |
| | | | | 174/100 |
| 4,073,000 | A * | 2/1978 | Krejsa | H02B 13/02 |
| | | | | 200/50.09 |
| 4,178,624 | A | 12/1979 | Wilson et al. | |
| 5,172,300 | A * | 12/1992 | Morby | H02B 1/056 |
| | | | | 361/637 |
| 5,510,960 | A | 4/1996 | Rosen | |
| 5,642,256 | A * | 6/1997 | Pugh | H02B 11/133 |
| | | | | 200/50.02 |
| 5,905,631 | A * | 5/1999 | Winkler | H02B 1/21 |
| | | | | 211/162 |
| 9,391,413 | B2 * | 7/2016 | Blasbalg | H01R 25/161 |
| 2015/0244122 | A1 * | 8/2015 | Greenwood | H01R 13/46 |
| | | | | 439/110 |

* cited by examiner

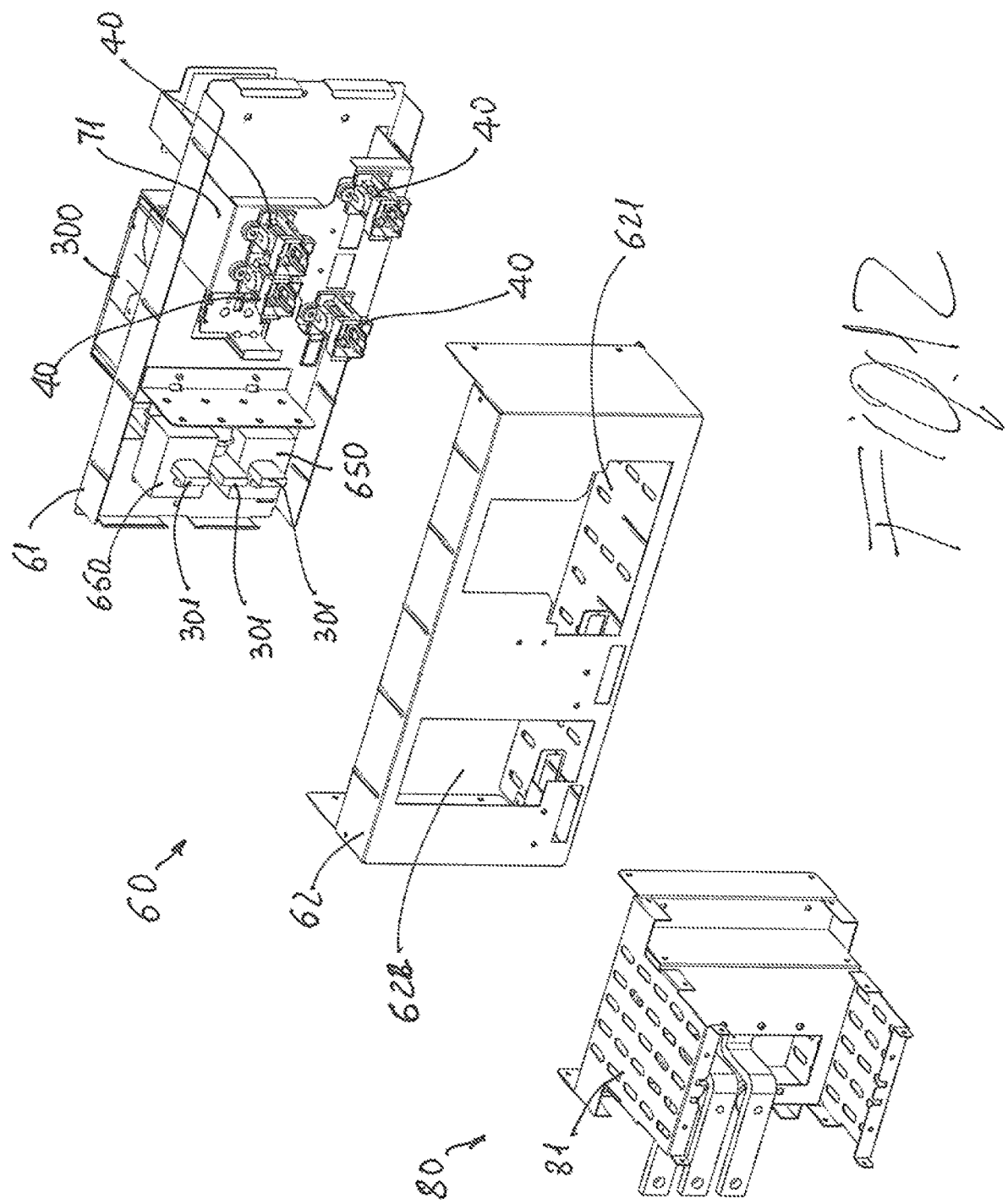

LOW VOLTAGE ELECTRICAL SWITCHBOARD

The present invention relates to an electrical switchboard, in particular a low voltage electrical switchboard which has improved functions and characteristics.

Generally, cabinets for low-voltage electrical distribution switchboards are specifically designed and built so as to meet the functional and installation requirements of the components that constitute the switchboard. It is in fact known that electrical switchboards use a system of mutually parallel metallic bars, the so called busbars, each of which is connected to a corresponding phase of a power supply system. Inside the cabinet, the bars are electrically connected to the apparatuses used in the switchboard, for example circuit breakers, switches, pushbuttons, control instruments and similar apparatuses, and are geometrically coupled to appropriate insulation and supporting devices. The connection between busbars and apparatuses is formed by means of appropriate conductors, such as for example plates, appropriately shaped according to the type of apparatus.

The busbar-supporting devices, in addition to mutually electrically insulating the bars, allow connecting them to the structure of the cabinet. In this manner, any electrodynamic stresses produced by the flow of current in the bars are discharged onto the structure of the cabinet, which accordingly must have adequate structural strength characteristics. Furthermore, the electrical devices are arranged on one or more fixing guides, which are connected to the frame of the cabinet either directly or by using additional connecting elements.

Within the cabinets of the switchboards, the bars are coupled geometrically to purposely designed devices that support the bars, insulating them electrically from one another, and enable their connection to the more resistant frame of the cabinet. In this way, in addition to the normal structural support, said devices also enable the possible electrodynamic stresses produced by the flow of current in the bars to be discharged on the frame.

In order to keep separated, for safety reasons, the busbars from the front volume of the switchboard into which the apparatuses are housed, an insulating partition is normally provided in the switchboard.

On the front side of the switchboard there is usually provided an apparatus compartment in which one or more electrical apparatuses, e.g., circuit breakers, switches, pushbuttons, control instruments and similar apparatuses, are housed. In some cases, one or more of said electrical apparatuses are housed in a drawer that can be extracted from and inserted into a connection position with the busbars inside the switchboard.

For the purpose of connection between apparatuses and busbars, the insulation partition between the busbar compartment and the apparatus compartment is normally designed so as to allow the passage of connecting means between the apparatuses and the busbars.

At the current state of the art, the existing low voltage switchboards have a number of disadvantages that it would be desirable to overcome.

For instance, the use of supporting devices of known type presents some drawbacks, above all as regards the number and kind of components which are required for supporting the busbars and for creating an insulating partition between the busbars compartment and the apparatus compartment.

Indeed, with reference to FIG. 1, a conventional switchboard 100 normally comprises a supporting structure having a base 101 and a top 102 which are structurally connected by vertical uprights 103. A number of plates 104 are provided inside the switchboard to create a partition between the busbar compartment and the apparatus compartment 105 located on the front of the switchboard 100. In the apparatus compartment 105, a number of electrical apparatuses 120 are housed, some of them being positioned on one or more drawers 121 that can be extracted from and inserted into a connection position with the busbars 106 inside the switchboard 100.

With reference to FIG. 2, the various busbars 106 are supported at various height by a number of front supports 107 which are fixed to a front mounting bracket 108, and by a number of rear supports 109 which are fixed to a rear mounting bracket 110. It is worth noting that the rear supports 109 have normally different shapes and dimensions with respect to the front supports 107. In addition, the rear mounting brackets 110 have normally different shapes and dimensions with respect to the front mounting brackets 108.

The plates 104, the front mounting bracket 108 and the rear mounting bracket 110 are fixed to the supporting structure of the switchboard 100 by a number of screws 111.

It is clear from the above that the existing solution is clearly disadvantageous in so far as it involves the use of a high number of constructional components (e.g., the plates 104, the front supports 107 and the corresponding front mounting brackets 108, the rear supports 109 and the corresponding rear mounting brackets 110) which require screw means for their fixing, with a consequent increase in the production costs and in the production times, as well as in the times and difficulties of assembly.

Moreover, further devices are required to fix and isolate the top and bottom ends of the busbars 106, thereby further increasing the number of constructional components, and consequently the constructional complexity and the corresponding drawbacks in terms of manufacturing and assembling costs and times.

A further problem is given by the fact that the busbars 106 are supported by the front 107 and rear 109 supports only at discrete points along their vertical development (i.e. not continuously) thereby making difficult for the busbars assembly 106 to withstand the electrodynamic stresses, particularly under short circuit conditions. Such problem can be only partially solved by using a high number of front 107 and rear 109 supports closely spaced from each other along the vertical development of the busbars 106, but such a solution further increases the number of components and complicates the assembly procedure of the busbars 106 into the switchboard 100.

Still a further problem of existing switchboard is given by the critical connection between apparatuses and busbars. Indeed, during insertion and extraction of the means, e.g. clamps or similar connecting means, connecting the electrical apparatuses—as well as the drawers in which they are mounted—and the busbars there is always a risk of accidental arcs that may occur between the phases. To avoid, or at least to reduce, such risk and in order to achieve a desired level of IP protection between live parts of the switchboard, complicated insulating systems between the phases are normally provided in the conventional low voltage switchboard.

Another problem recently emerged due to regulation changes, is the necessity of having a mechanical locking system that prevent insertion of an apparatus, e.g. a circuit breaker, and consequently also of the drawer in which the circuit breaker is preassembled, if the contacts of the apparatus are closed, and also prevent extraction of said apparatus (and related drawer) when the contacts of the apparatus are closed.

In general, the existing drawers are relatively heavy and formed by a relatively high number of parts, that make cumbersome their assembly, the installation of the electrical apparatuses inside them, and the operation of insertion into and extraction from an operative position inside the switchboard.

Hence, the present disclosure is aimed at providing a low voltage switchboard, which allows overcoming at least some of the above-mentioned shortcomings.

In particular, the present invention is aimed at providing a low voltage switchboard, in which the number of components needed for fixing the busbars assembly, separating the busbars compartment form the apparatus assembly, and inserting/extracting one or more electrical apparatuses in the switchboard, is greatly reduced.

Furthermore, the present invention is aimed at providing a low voltage switchboard, in which the risk of accidental arcs between the phases during insertion/extraction of one or more electrical apparatuses in the switchboard, is avoided or at least greatly reduced with respect to conventional switchboards.

In addition, the present invention is aimed at providing a low voltage switchboard, which meets the current requirements concerning safety mechanical locking of the electrical apparatuses and drawers preventing their insertion/extraction, when said electrical apparatuses are in the ON condition.

Also, the present invention is aimed at providing a low voltage switchboard that is reliable and relatively easy to produce at competitive costs.

Thus, the present invention relates to a low voltage electrical switchboard comprising a supporting structure having vertical uprights and horizontal crossbars and further comprising a busbar compartment housing one or more busbars and an apparatus compartment housing one or more electrical apparatuses, said busbar compartment and said apparatus compartment being separated by a partitioning and insulating wall. The low voltage electrical switchboard of the present invention is characterized in that said partitioning and insulating wall has a first surface facing said busbar compartment which is provided with a plurality of retaining and supporting means for said busbars, and a second surface facing said apparatus compartment which is provided with a plurality of openings for insertion/extraction of first connection means between said busbars and said one or more electrical apparatuses through said partitioning and insulating wall, said first connection means being provided with first insulation means that cooperate with said partitioning and insulating wall to increase the distance in air between the phases during insertion/extraction of said connection means, said low voltage switchboard being further provided with mechanical locking means for locking said one or more electrical apparatuses and preventing their insertion/extraction into/from an operating position in contact with said busbars under predetermined conditions.

As better explained in the following description, thanks to the particular structure of the electrical switchboard of the present invention, the above-mentioned problems can be avoided, or at least greatly reduced.

Indeed, the mechanical locking means for locking the electrical apparatuses and preventing their insertion/extraction into/from an operating position in contact with said busbars under predetermined conditions, e.g. when said electrical apparatuses are in the ON position, allow meeting the current regulation requirements.

As better explained in the following description, the first insulation means of the first connection means allow increasing the insulation performances at the connection points between the busbars and the electrical apparatus, thereby avoiding, or at least greatly reducing, the risk of accidental arcs during the insertion/extraction operation of the electrical apparatus in the switchboard.

In addition, the partitioning and insulating wall has the double function of supporting the busbars and creating an effecting insulating and partitioning wall between the busbar compartment and the apparatus compartment inside the low voltage switchboard, thereby greatly reducing the number of components normally required for achieving the two functionalities.

In a preferred embodiment of the low voltage electrical switchboard, according to the present invention, at least some—but preferably all—of said plurality of openings for insertion/extraction of said first connection means are provided with a raised edge which protrudes from said second surface of said partitioning and insulating wall. In practice, as better explained in the following detailed description, the raised edge practically surrounds the opening and cooperates with the first connection means to guarantee better insulation performances in correspondence of the connection points According to a largely preferred embodiment of the low voltage electrical switchboard of the present disclosure, said partitioning and insulating wall is made of a plurality of insulating modules which stacked on each in the vertical direction to form a continuous wall. Said insulating modules are described in details in the co-pending European patent application having title "COMPARTMENT-PARTITIONING AND BUSBAR-SUPPORTING DEVICE IN A CABINET FOR A LOW VOLTAGE ELECTRICAL SWITCHBOARD" in the name of the same applicant, whose description is entirely incorporated herein by reference, and therefore will not be further described in detail.

In a typical exemplary embodiment of the presently disclosed low voltage electrical switchboard, the busbar compartment is therefore closed on its front by said partitioning and insulating wall, while on the opposite sides it can be conveniently delimited by a rear wall which is preferably made of a plurality of the above-mentioned insulating modules spaced apart in the vertical direction.

Preferably said first connection means conveniently comprise a shaped hollow body which is made of insulating material. The hollow body houses one or more busbar fixing means, typically clamping means, which have on one end a connecting clamp that is configured for connection with one of said busbars and on an opposite end a conductive braid for connection with a terminal of one of said electrical apparatuses.

Therefore, in a largely preferred embodiment of the low voltage electrical switchboard of the present invention, said shaped hollow body cooperates, on a first side, with one of said raised edge which protrude from the second surface of said partitioning and insulating wall and is provided, on a second side opposite to said first side, with fixing means for coupling with one of said electrical apparatuses. Said fixing means can be quick fixing means (e.g. clamping, snap-fitting, sliding means) or screw means or a combination of the two.

In order to make easier the assembly of the connection means, particularly when they comprise e.g. two or more connecting clamps, said said shaped hollow body can conveniently be formed by combining a first and a second half shell which are connected together to form a housing for said connecting clamp or clamps.

In a typical embodiment of the low voltage electrical switchboard, according to the present disclosure, one or more of said electrical apparatuses is a drawer supporting and housing one or more electrical devices. Thus, for the purposes of the present disclosure, the term "electrical apparatus" may be used to indicate not only a particular electrical device (e.g., a circuit breaker, or a switch, a pushbutton, a control instruments or similar apparatuses), but also a drawer which is used to support said electrical device and to insert and withdrew it into/from said low voltage switchboard.

Therefore, in a preferred embodiment of the low voltage electrical switchboard, according to the present disclosure, said drawer comprises a front plate and a back plate. Said back plate is typically fixed on the supporting structure of the switchboard, e.g. on at least two uprights of said switchboard, while said front plate is insertable into and withdrawable from said back plate. The sliding mechanical coupling between said front plate and said back plate can be provided with grooves and corresponding raised ridges positioned on said front plate and on said back plate in whatever order (i.e., ridges on the front plate and grooves on the back plate, or grooves on the front plate and ridges on the back plate). Other forms of sliding coupling can be selected according to the needs.

Typically the front plate is advantageously configured to support one or more electrical devices while said back plate can comprises one or more windows for the passage of at least said first connection means. In practice, accessibility of the electrical device by an operator occurs through the front plate, while connection of the electrical device to the busbar occurs through the back plate.

In order to make easier and faster the assembly of the electrical device into the drawer, and the insertion/extraction operation of the electrical device by an operator, in a preferred embodiment of the present invention, said low voltage electrical switchboard can conveniently comprise a first connection kit which comprises a first bracket that is configured to support one or more of said first connection means.

In practice, according to this embodiment, said first bracket can be fixed on the rear part of the front plate of said drawer. The first bracket can be conveniently provided with a number of openings into which the first connection means can be inserted and secured.

For instance, the hollow body of the first connection means can be inserted into the openings of the first bracket and secured thereto. The clamping means housed in the hollow body are connected to the terminals of the electrical device with, e.g. a conductive braid, while the connecting clamps protrude from the rear part of the first bracket for connection with one of said busbars.

In this way, the electrical device and its connection with the busbar can be easily and quickly preassembled in the front plate of the drawer thereby minimizing the operation that need to be carried out in the installation site of the switchboard.

Furthermore, as better explained in the following detailed description, the low voltage electrical switchboard, according to the present disclosure, can conveniently comprise a second connection kit which comprises a second bracket that is configured to support second connection means for the outgoing connection of said electrical device. The second bracket is conveniently fixed to the supporting structure of the switchboard, e.g. to the uprights of the switchboard, and said second connection means are advantageously configured so as to allow a plug-in connection with corresponding connection means provided in said electrical device.

Finally, depending on the needs, the low voltage electrical switchboard, according to the present disclosure, can comprise one or more supporting brackets configured to be fixed on said front plate and one or more supporting brackets configured to be fixed on said front plate for supporting one or more instruments and/or auxiliary devices.

Further features and advantages of the present invention will be more clear from the description of preferred but not exclusive embodiments of a low voltage switchboard, shown by way of examples in the accompanying drawings, wherein:

FIG. 12 is a second perspective view of first embodiment of a second supporting bracket for second connection means usable in a low voltage electrical switchboard according to the invention.

Figure 1:
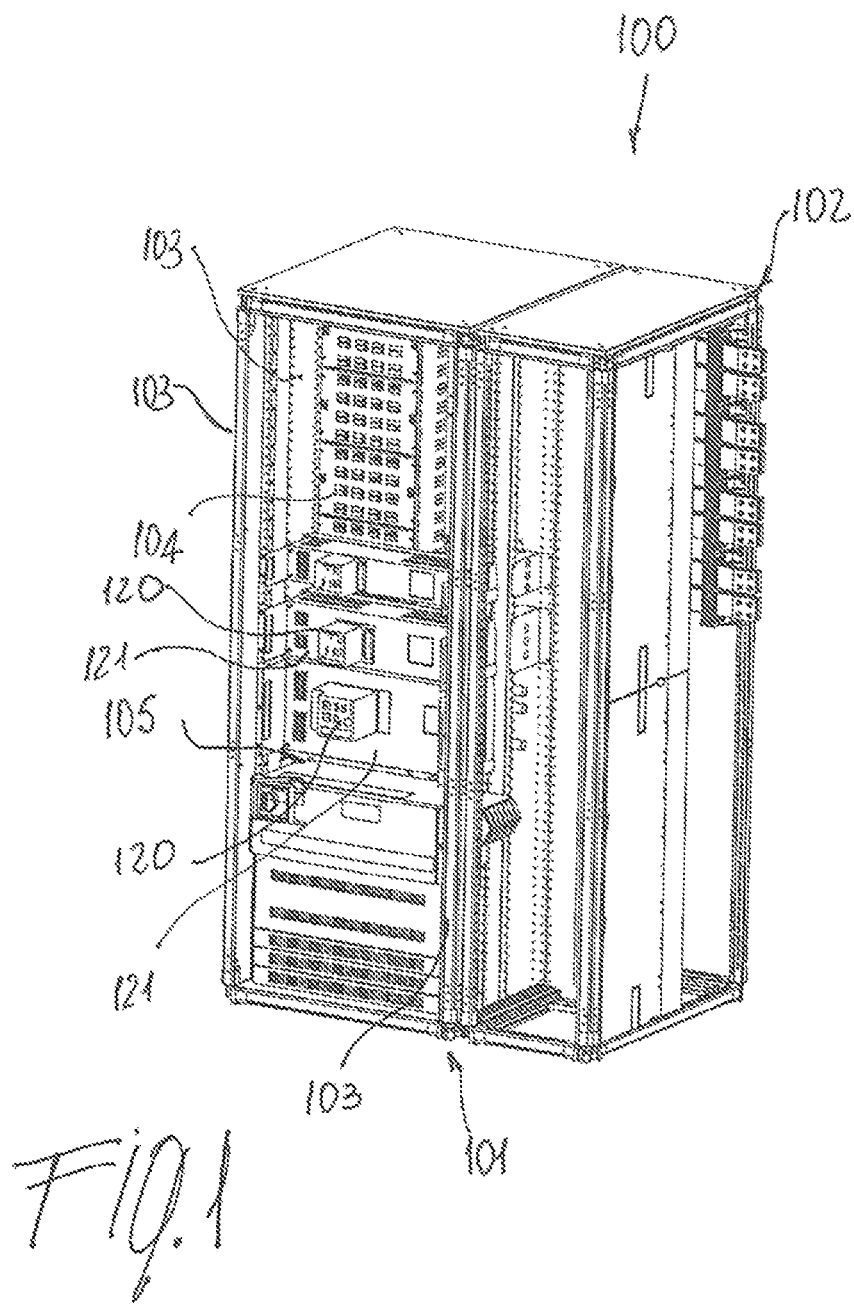
FIG. 1 is a perspective view of a low voltage electrical switchboard according to the prior art.
Figure 2:
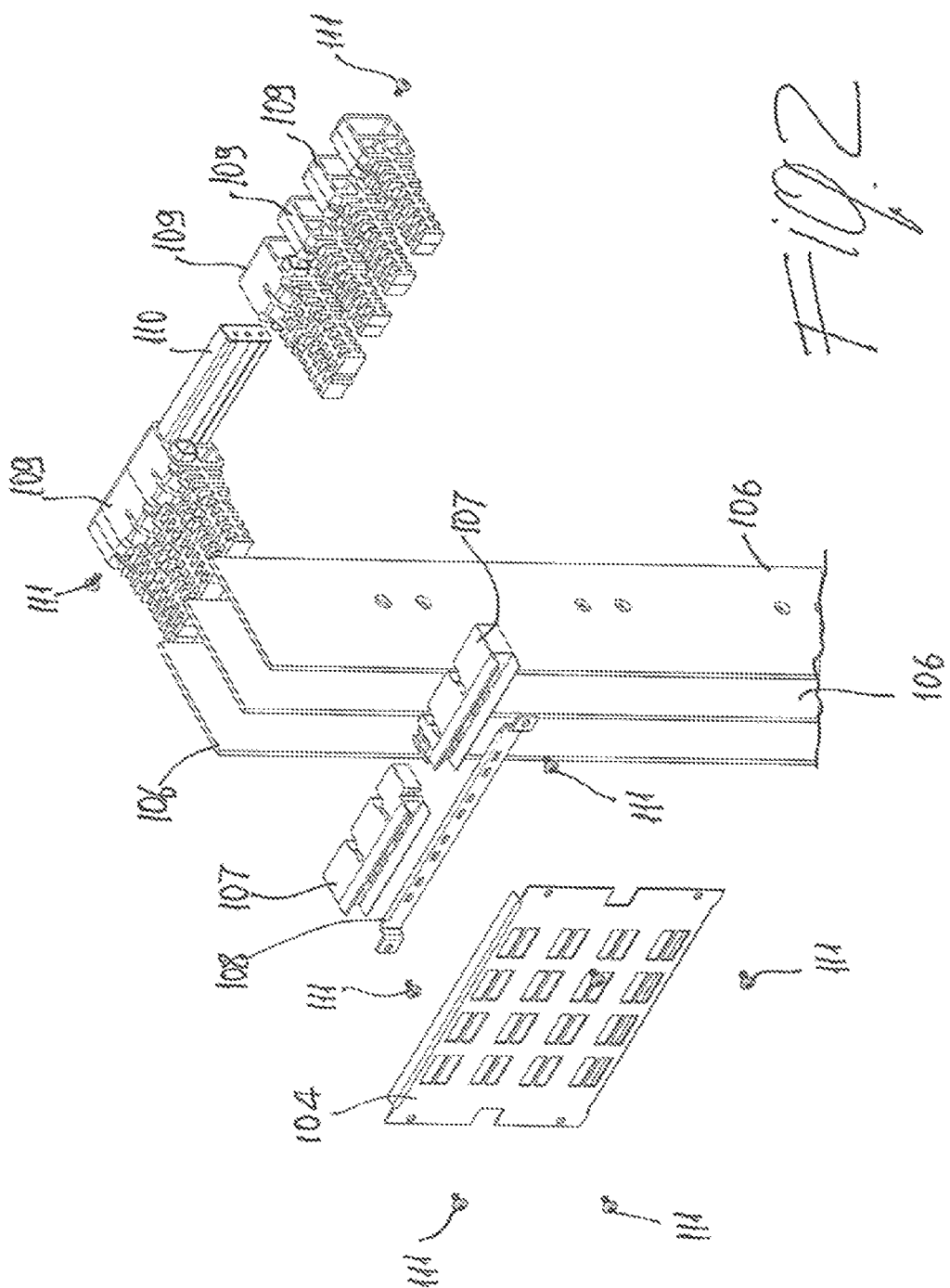
FIG. 2 is an exploded view of the components forming a supporting device for the busbars and a partition wall in a low voltage electrical switchboard according to the prior art.

With reference to the attached FIGS. 3-12, the low voltage electrical switchboard 1 of the present invention, in its more general definition, comprises a supporting structure 2 normally constituted by a number of vertical uprights 3 and horizontal crossbars 4 firmly connected together. The internal space of the switchboard 1 is divided at least in a busbar compartment 10 housing one or more busbars 5 and an apparatus compartment 20 into which one or more electrical apparatuses 6 are positioned. The busbar compartment 10 and the apparatus compartment 20 are kept separated by a partitioning and insulating wall 30, running substantially along the entire vertical length of the two compartments.

One of distinguishing features of the low voltage electrical switchboard 1 of the present invention is given by the fact that said partitioning and insulating wall 30 has a first surface 31 facing said busbar compartment 10 which is provided with a plurality of retaining and supporting means for said busbars 5. In other words, differently from prior art switchboards which needed dedicated partitioning plates between the compartments and dedicated supporting devices for the busbars, in the low voltage electrical switchboard 1 of the present invention the partitioning and insulating wall 30 carries out both the insulating/partitioning function and the busbar-supporting function.

Then, the partitioning and insulating wall 30 has a second surface 32 facing said apparatus compartment 20 which is provided with a plurality of through-openings 33 that allow insertion/extraction of first connection means 40 between said busbars 5 and said one or more electrical apparatuses 6 through said partitioning and insulating wall 30.

A further distinguishing features of the low voltage electrical switchboard 1 of the present invention is given by the fact that said first connection means 40 are being provided with first insulation means 41 that cooperate with said partitioning and insulating wall 30 in order to increase the distance in air between the phases during insertion/extraction of said connection means 40, thereby avoiding the risk of accidental arcs during the insertion/extraction operation of the electrical apparatus in the switchboard.

Still a further distinguishing features of the low voltage electrical switchboard 1 of the present invention is given by the fact that it is provided with mechanical locking means for locking said one or more electrical apparatuses 6 and preventing their insertion/extraction into/from an operating position in contact with said busbars 5 under predetermined conditions. For instance, in the case of circuit breakers, the mechanical locking means prevent insertion/extraction of a circuit breaker when its contacts are in the closed position.

Figure 3:
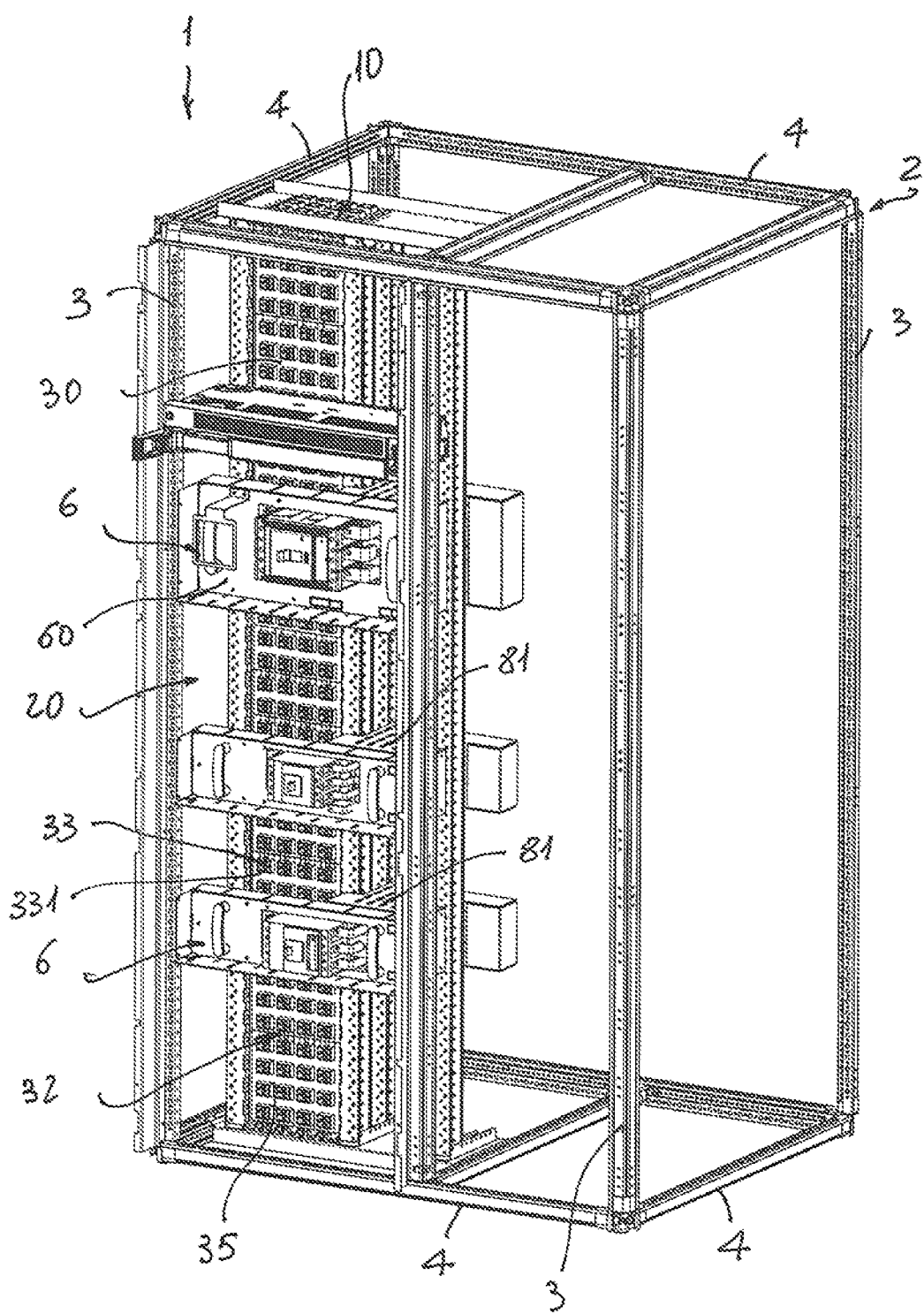
FIG. 3 is a first perspective view from the front of a low voltage electrical switchboard according to the invention.

With reference to FIG. 3, in an exemplary embodiment of the low voltage switchboard 1 the second surface 32 of the partitioning and insulating wall 30 is provided, in correspondence of said plurality of openings 33 for insertion/extraction of said first connection means 40, with raised edges 331 protruding from said second surface 32 and surrounding said openings 33. In this way, it is possible to increase the air distance between the phases during extraction of the means, e.g. clamps, connecting said electrical apparatuses and said busbars, as well as to achieve the IP20 protection between live parts of the switchboard According to a particularly preferred embodiment of the low voltage electrical switchboard 1, according to the present invention, said partitioning and insulating wall 30 is made of a plurality of insulating modules 35 stacked on each in the vertical direction to form a continuous wall. Such insulating modules 35 are disclosed in the above-referred co-pending European patent application and will not be further described in details.

Figure 4:
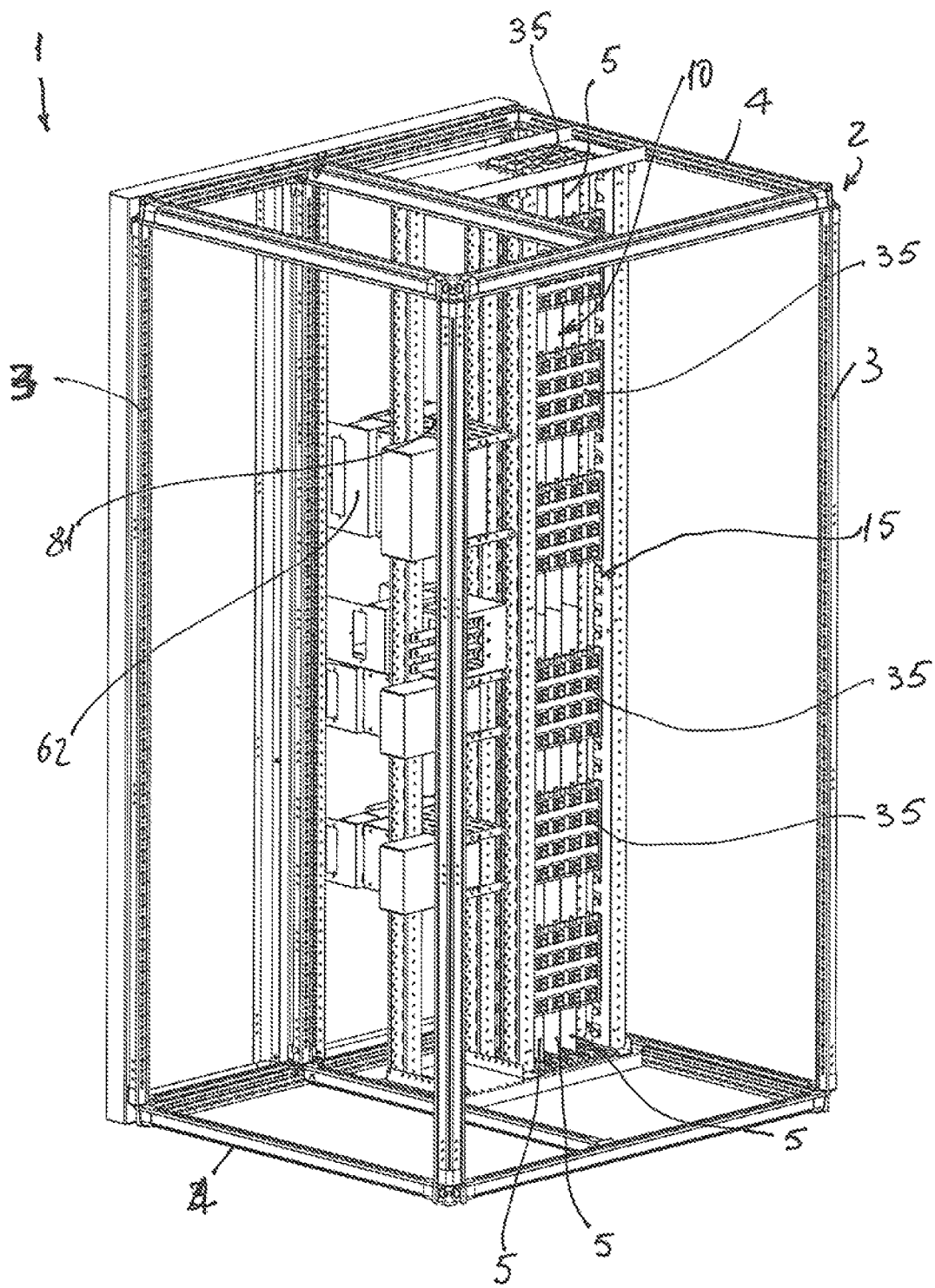
FIG. 4 is a second perspective view from the rear of a low voltage electrical switchboard according to the invention.

As shown in FIG. 4, in a typical embodiment of the low voltage electrical switchboard 1, the busbar compartment 10 has a rear wall 15, opposite to said partitioning and insulating wall 30, which is also preferably made of a plurality of said insulating modules 35 spaced apart in the vertical direction. The number of insulating modules 35 used in such rear wall 15 and their relative distance may be selected according to the needs, depending on the rated Icw of the switchboard.

Figure 9:
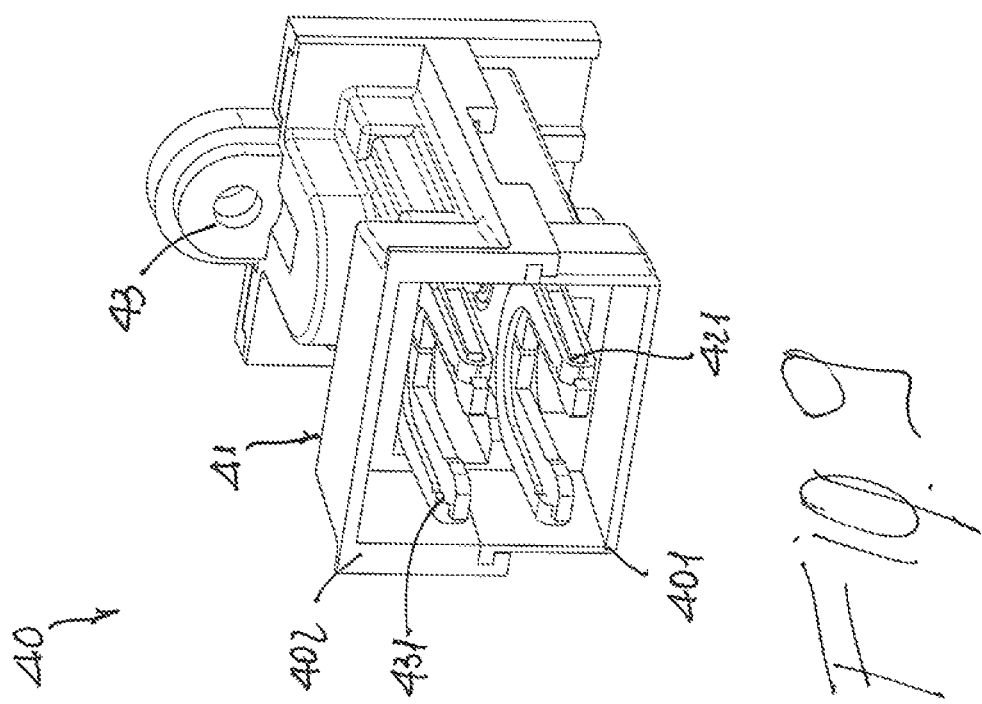
FIG. 9 is a perspective view of first embodiment of first connection means usable in a low voltage electrical switchboard according to the invention.
Figure 10:
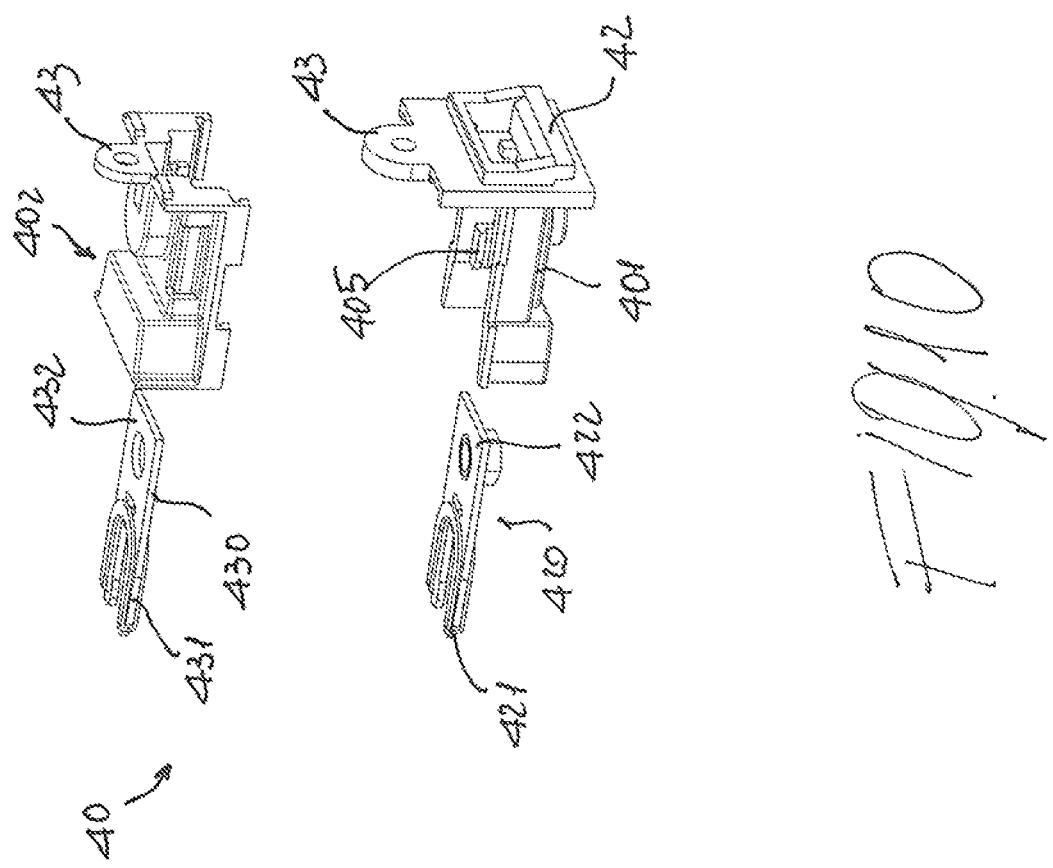
FIG. 10 is an exploded view of first embodiment of first connection means usable in a low voltage electrical switchboard according to the invention.

With particular reference to FIGS. 9 and 10, in an exemplary embodiment of the low voltage electrical switchboard of the present invention, the first connection means 40 comprise a shaped hollow body 41 which is made of insulating material. Inside the shaped hollow body 41, one or more clamping means 420, 430 are housed. The number of clamping means 420, 430, generally one or two, can be selected according to the needs, i.e. the rated current to be carried.

The clamping means 420, 430 generally have on one end a connecting clamp 421, 431 which is configured for connection with one of said busbars 5 and on an opposite end 422, 432 a conductive braid (not shown in the figure) for connection with a corresponding terminal of one of said electrical apparatuses 6. The braids are at least partially contained in and supported by the insulating hollow body 41, so as to withstand the vertical and lateral electrodynamic stresses in case of short circuit.

Preferably, said shaped hollow body 41 cooperates, on a first side, with one of said raised edges 331 protruding from said second surface 32 of said partitioning and insulating wall 30 so as to increase the distance in air between the phases and completely isolate the connecting clamp 421, 431 during the insertion/extraction operation of the electrical apparatus 6.

Then, the shaped hollow body 41 is conveniently provided, on a second side opposite to said first side, with fixing means 42, 43 for coupling with one of said electrical apparatuses 6, as better explained in the following description.

As shown in details in FIG. 10, said shaped hollow body 41 is conveniently realized using a first 401 and a second 402 half shell connected together to form the housing for the clamping means 420, 430. Such design greatly facilitate the assembly of the first connection means 40. The first 401 and second 402 half shell can be easily connected together by using quick connection means, e.g. a tooth 405 in the first half shell 401 which engages a corresponding slot or equivalent retaining means in the second half shell 402.

In a particularly preferred embodiment of the low voltage electrical switchboard 1, according to the present invention, said electrical apparatus 6 is a drawer 60 housing one or more electrical devices 300. As previously pointed out, for the purposes of the present disclosure, the term "electrical apparatus" may be used to indicate not only a particular electrical device (e.g., a circuit breaker, or a switch, a pushbutton, a control instruments or similar apparatuses), but also a drawer which is used to support said electrical device and to insert and withdrew it into/from said low voltage switchboard.

Figure 5:
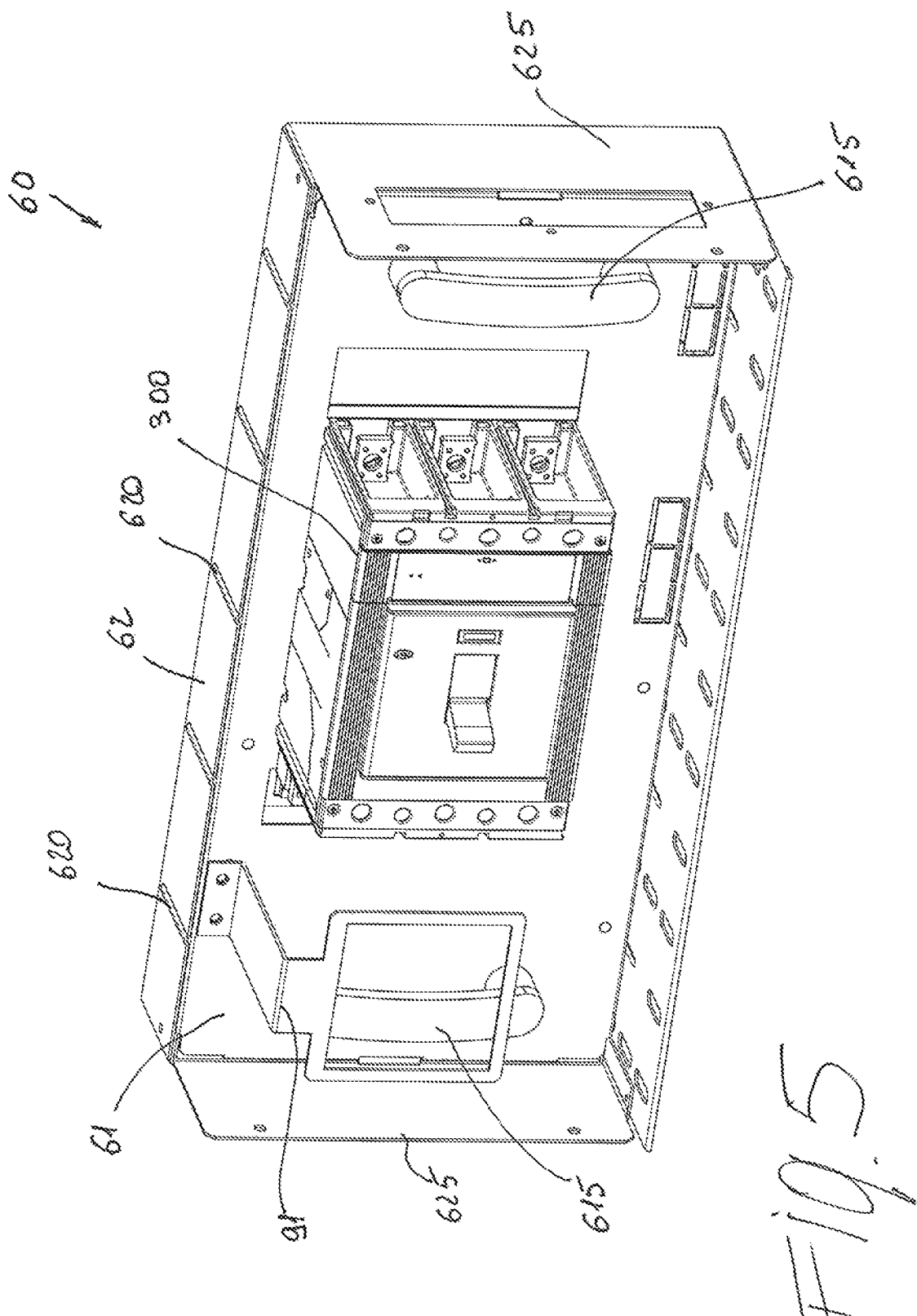
FIG. 5 is a perspective view of an embodiment of a drawer usable in a low voltage electrical switchboard according to the invention.
Figure 6:
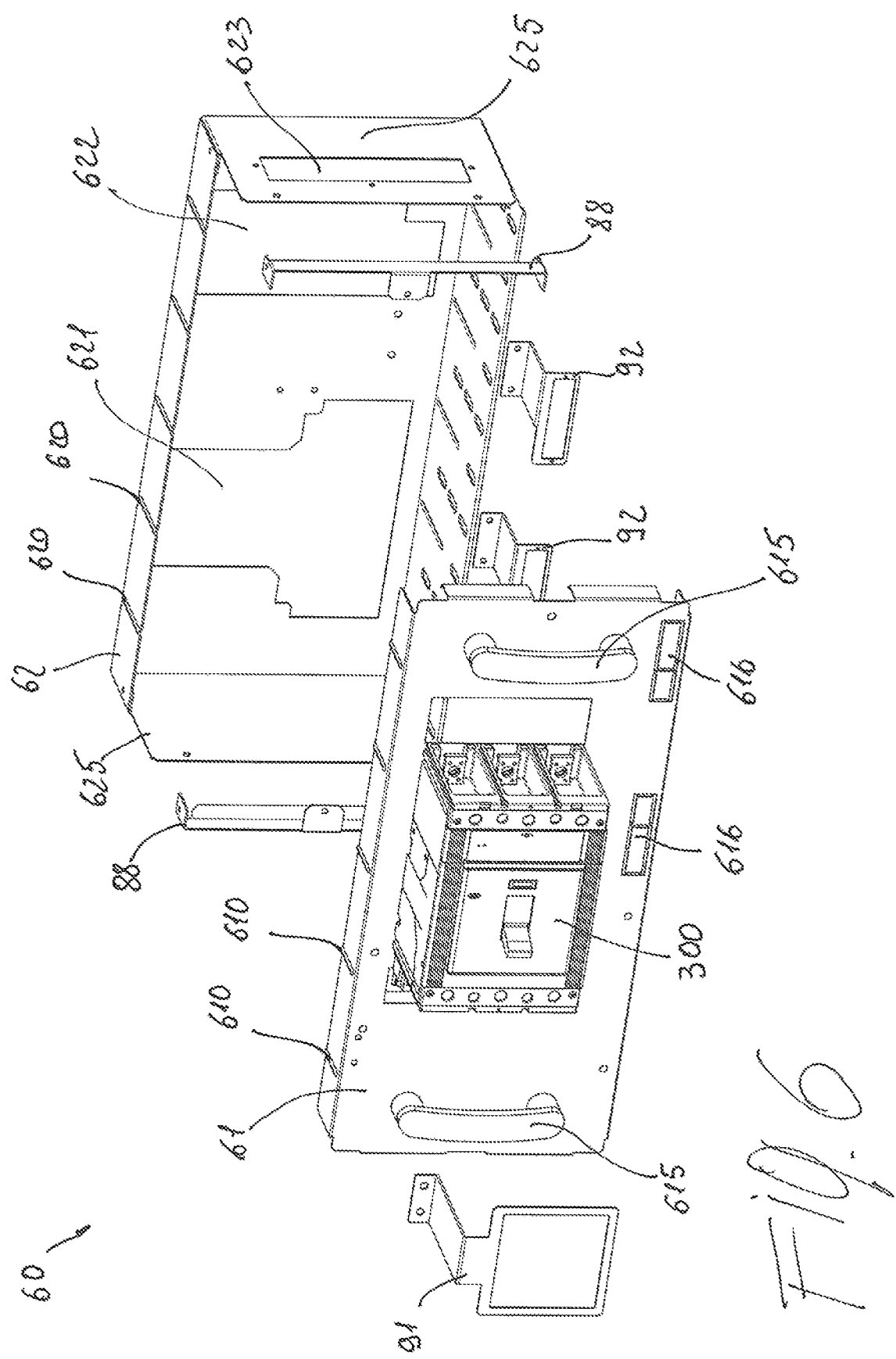
FIG. 6 is an exploded view of an embodiment of a drawer usable in a low voltage electrical switchboard according to the invention.

With particular reference to FIGS. 5 and 6, the drawer 60 typically comprises a front plate 61 and a back plate 62. The back plate 62 is conveniently fixed on the supporting structure 2 of said switchboard 1 (e.g. on the vertical uprights 3 as shown in FIGS. 3 and 4), using fixing means (e.g. screw means), by connecting, e.g., the lateral sides 625 of the back plate 62 to the supporting structure 2 of said switchboard 1.

The front plate 61 is insertable into and withdrawable from said back plate 62 using sliding coupling means between them. In particular said front plate 61 can be provided with raised ridges 610 slidingly insertable into corresponding grooves 620 provided on said back plate 62. It is also possible to have the grooves on the front plate and the raised ridges on the back plate, as well as to use different coupling sliding means between said front plate 61 and said back plate 62. The front plate 61 and the back plate 62 can be fixed directly to each other and/or through an intermediate fixing bracket 88.

The front plate 61 of the drawer 60 is configured to support one or more electrical devices 300 and to allow its front accessibility by an operator. Moreover, the front side of the front plate 61 can be conveniently provided with a pair of handles 615 to make easier its handling and the insertion/extraction operations.

The back plate 61 of the drawer 60 conveniently comprises one or more windows 621, 622, 623 for the electrical connection of the device 300. In particular at least one of said window 621 is configured for the passage of said first connection means 40.

Figure 7:
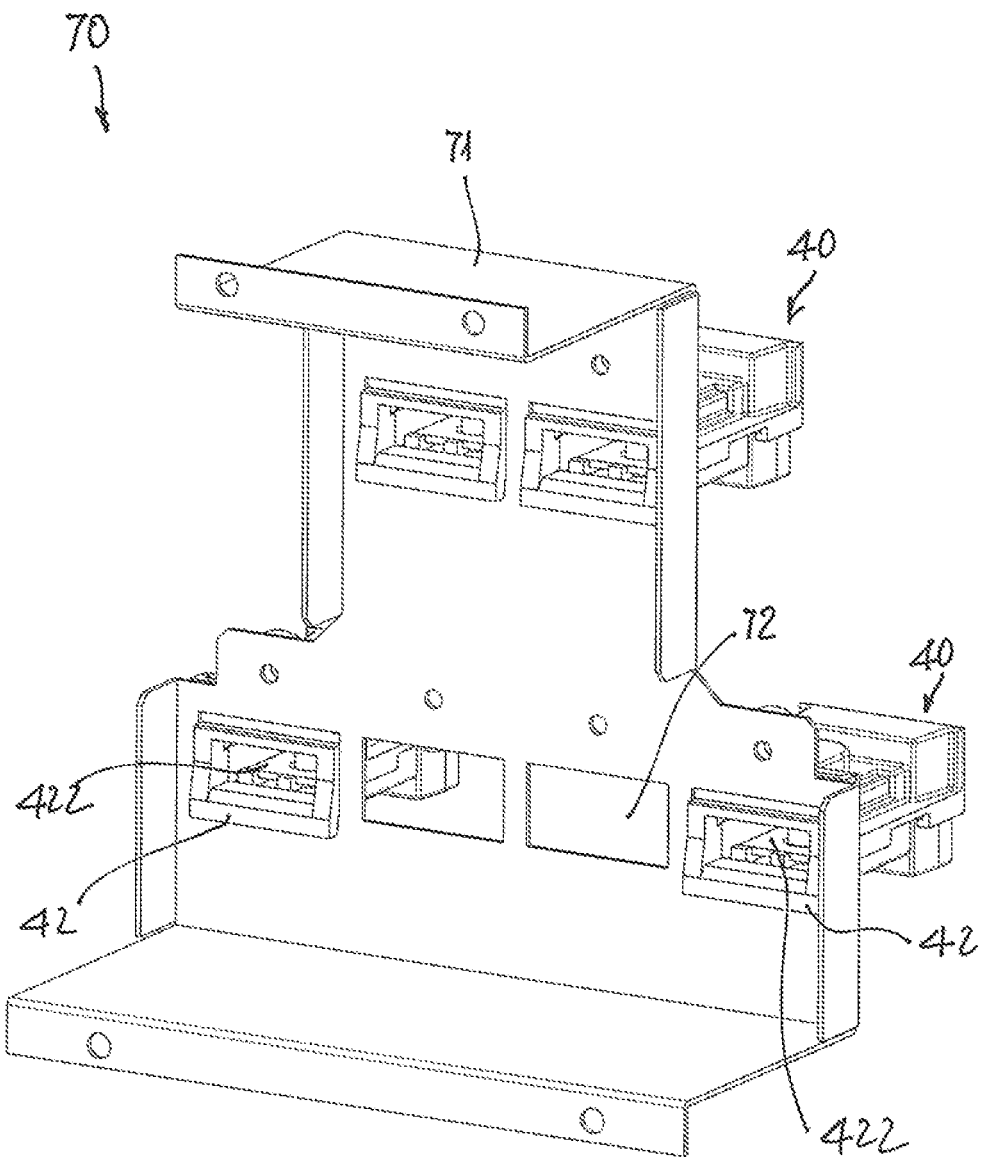
FIG. 7 is a first perspective view of first embodiment of a first supporting bracket for first connection means usable in a low voltage electrical switchboard according to the invention.
Figure 8:
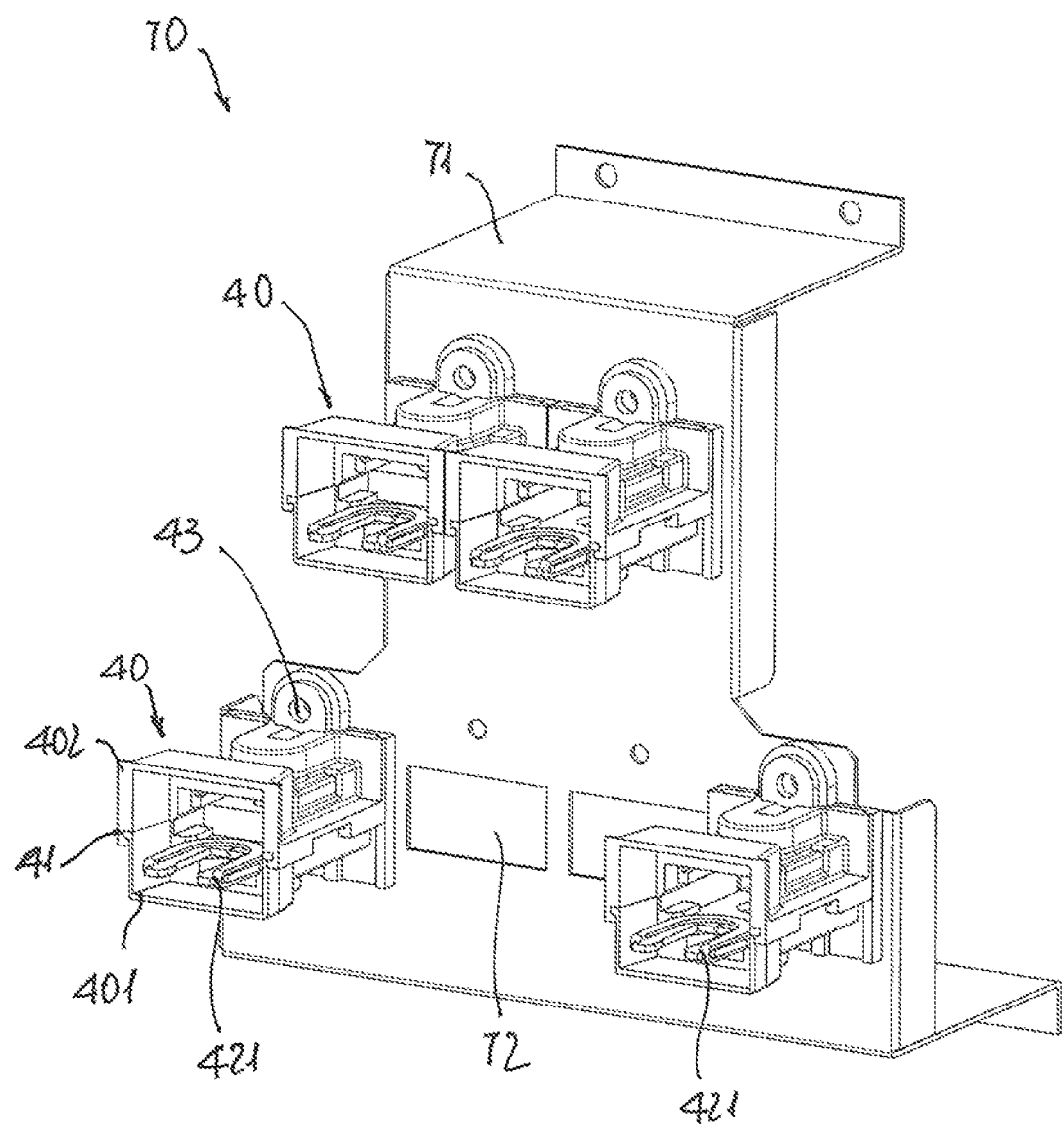
FIG. 8 is a second perspective view of first embodiment of a first supporting bracket for first connection means usable in a low voltage electrical switchboard according to the invention.

With reference to FIGS. 7 and 8, in a preferred embodiment of the low voltage electrical switchboard 1 of the present invention, said first connection means 40 are conveniently supported by a first connection kit 70 comprising a first bracket 71 which is configured to support first connection means 40. In particular, said first bracket 71 comprises a plate having a number of openings 72 into which the first connection means 40 are inserted.

In practice, as shown in FIGS. 7 and 8, one end of the shaped hollow body 41 is inserted into one of said openings 72 and is kept into place by the fixing means 42, e.g. an elastic tooth 42 that engages the surface of the plate of the first bracket 71, as shown in FIG. 7. With reference to FIG. 8, on the other side of the plate of the first bracket 71, the hollow body 41 is kept into place by using the fixing means 43, e.g. screw means entering the seat 43 on the hollow body 41 and a corresponding seat of the first bracket 71.

As previously explained, the end 422 of the clamping means 420 is conveniently connected to a corresponding terminal of the electrical device 300 using conductive braids. As shown in FIG. 12, the first bracket 70 is then fixed on the rear part of the front plate 61 of said drawer 60.

Figure 11:
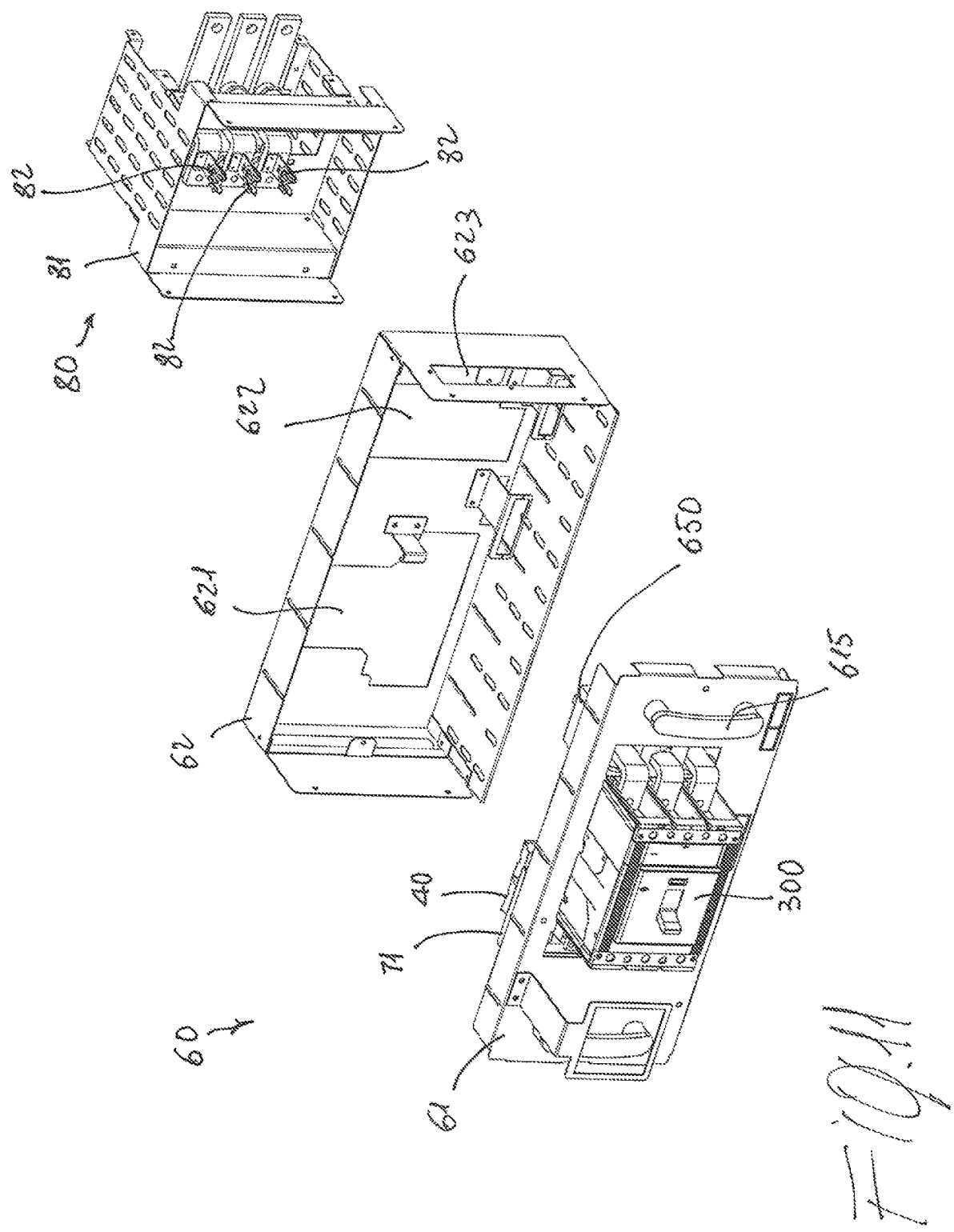
FIG. 11 is a first perspective view of first embodiment of a second supporting bracket for second connection means usable in a low voltage electrical switchboard according to the invention.

With reference to FIGS. 11 and 12, in a further preferred embodiment of the low voltage electrical switchboard 1 of the present invention, said low voltage electrical switchboard 1 advantageously comprises a second connection kit 80 for the outgoing connection of the electrical device 300.

According to this embodiment, the second connection kit 80 comprises a second bracket 81 which is configured to support second connection means 82 for the outgoing connection of said electrical device 300. As shown in the above mentioned figures, the second bracket 81 is conveniently fixed to the supporting structure 2 of the switchboard 1 so that the second connection means 82 face toward the front of the switchboard 1. When the drawer 60 is inserted into the switchboard 1, the second connection means 82 can be connected to the outgoing connection terminals 301 of the electrical device 300 through the window 622 on the back plate 62 of the drawer 61.

Advantageously, the connection between the second connection means 82 and the outgoing connection terminals 301 of the electrical device 300 is of the plug-in type, e.g., each of said second connection means 82 can be provided with connecting clamp for insertion-clamping a corresponding connection terminals 301 of the electrical device 300. Alternatively, the outgoing connection of the electrical device 300 to downstream apparatuses can be carried out by directly connecting the downstream apparatuses to the outgoing connection terminals 301 through a window 623 provided in the lateral side of the back plate 62 of the drawer 60.

In particular embodiments of the low voltage electrical switchboard 1, according to the present invention, it is possible to have one or more supporting brackets 91 which are configured to be fixed on said front plate 61 of said drawer 60 for supporting one or more instruments or similar devices. It is also possible, to one or more supporting brackets 92 which are configured to be fixed on said back plate 62 of said drawer 60 for supporting, e.g., the plug connection of an auxiliary device. In such a case, the front plate 61 can be conveniently provided with an opening 616 allowing the male/female connection to said plug from the front plate 61 of the drawer 60. Auxiliary device, e.g. measurement transformers 650 can also be housed in the internal space of the drawer 60.

It is clear from the above description that the low voltage switchboard of the present invention, fully achieve the intended aims and solved the above-highlighted problems of the existing switchboards.

Several variations can be made to the low voltage switchboard thus conceived all falling within the scope of the attached claims. In practice, the materials used and the contingent dimensions and shapes can be any, according to requirements and to the state of the art.

The invention claimed is:

1. A low voltage electrical switchboard comprising a supporting structure having vertical uprights and horizontal crossbars and further comprising a busbar compartment housing one or more busbars and an apparatus compartment housing one or more electrical apparatuses, said busbar compartment and said apparatus compartment being separated by a partitioning and insulating wall, wherein said partitioning and insulating wall has a first surface facing said busbar compartment, and a second surface facing said apparatus compartment which is provided with a plurality of openings for insertion/extraction of first connection means between said busbars and said one or more electrical apparatuses through said partitioning and insulating wall, said first connection means being provided with first insulation means and a clamping means inside of the insulation means for connection with one of said busbars and one of said electrical apparatuses, wherein said partitioning and insulating wall is made of a plurality of insulating modules stacked on each other in the vertical direction to form a continuous wall, and wherein said busbar compartment has a rear wall made of a plurality of said insulating modules spaced apart in the vertical direction.

2. The low voltage electrical switchboard, according to claim 1, wherein at least some of said plurality of openings for insertion/extraction of said first connection means are provided with a raised edge protruding from said second surface of said partitioning and insulating wall.

3. A low voltage electrical switchboard comprising a supporting structure having vertical uprights and horizontal crossbars and further comprising a busbar compartment housing one or more busbars and an apparatus compartment housing one or more electrical apparatuses, said busbar compartment and said apparatus compartment being separated by a partitioning and insulating wall, wherein said partitioning and insulating wall has a first surface facing said busbar compartment, and a second surface facing said apparatus compartment which is provided with a plurality of openings for insertion/extraction of first connection means between said busbars and said one or more electrical apparatuses through said partitioning and insulating wall, said first connection means being provided with first insulation means and a clamping means inside of the insulation means for connection with one of said busbars and one of said electrical apparatuses, wherein said first connection means comprise a shaped hollow body made of insulating material which houses one or more of the clamping means, having on one end a connecting clamp configured for connection with one of said busbars and on an opposite end a conductive braid for connection with a terminal of one of said electrical apparatuses, and wherein said shaped hollow body comprises a first and a second half shell connected together.

4. The low voltage electrical switchboard, according to claim 3, wherein at least some of said plurality of openings for insertion/extraction of said first connection means are provided with a raised edge protruding from said second surface of said partitioning and insulating wall, and wherein said shaped hollow body is provided, on one side, with fixing means for coupling with one of said electrical apparatuses.

5. A low voltage electrical switchboard comprising a supporting structure having vertical uprights and horizontal crossbars and further comprising a busbar compartment housing one or more busbars and an apparatus compartment housing one or more electrical apparatuses, said busbar compartment and said apparatus compartment being separated by a partitioning and insulating wall, wherein said partitioning and insulating wall has a first surface facing said busbar compartment, and a second surface facing said apparatus compartment which is provided with a plurality of openings for insertion/extraction of first connection means between said busbars and said one or more electrical apparatuses through said partitioning and insulating wall, said first connection means being provided with first insulation means and a clamping means inside of the insulation means for connection with one of said busbars and one of said electrical apparatuses, wherein said electrical apparatus is a drawer housing one or more electrical devices, and wherein said drawer comprises a front plate and a back plate, said back plate being fixed on the supporting structure of said switchboard, said front plate being insertable and withdrawable from said back plate, said front plate and said back plate being provided with grooves and corresponding raised ridges for the sliding coupling of said front plate with said back plate, said front plate being configured to support one or more electrical devices and said back plate comprising one or more windows for the passage of at least said first connection means.

6. The low voltage electrical switchboard, according to claim 5, further comprising a first connection kit comprising a first bracket configured to support one or more of said first connection means.

7. The low voltage electrical switchboard, according to claim 6, wherein said first bracket is fixed on the rear part of said front plate of said drawer.

8. The low voltage electrical switchboard, according to claim 5, further comprising a second connection kit comprising a second bracket configured to support second connection means for the outgoing connection of said electrical device.

9. The low voltage electrical switchboard, according to claim 8, wherein said electrical device is provided with plug-in connection means for coupling with said second connection means.

10. The low voltage electrical switchboard, according to claim 5, further comprising one or more supporting brackets configured to be fixed on said front plate of said drawer and one or more supporting brackets configured to be fixed on said back plate of said drawer for supporting one or more instruments and/or auxiliary devices.

11. A low voltage electrical switchboard comprising a supporting structure having vertical uprights and horizontal crossbars and further comprising a busbar compartment housing one or more busbars and an apparatus compartment housing one or more electrical apparatuses, said busbar compartment and said apparatus compartment being separated by a partitioning and insulating wall, wherein said partitioning and insulating wall has a first surface facing said busbar compartment, and a second surface facing said apparatus compartment which is provided with a plurality of openings for insertion/extraction of first connection means between said busbars and said one or more electrical apparatuses through said partitioning and insulating wall, said first connection means being provided with first insulation means and a clamping means inside of the insulation means for connection with one of said busbars and one of said electrical apparatuses, wherein at least some of said plurality of openings for insertion/extraction of said first connection means are provided with a raised edge protruding from said second surface of said partitioning and insulating wall, and wherein said partitioning and insulating wall is made of a plurality of insulating modules stacked on each in the vertical direction to form a continuous wall, and wherein said busbar compartment has a rear wall made of a plurality of said insulating modules spaced apart in the vertical direction.

* * * * *